June 20, 1933. A. H. TAYLOR Re. 18,877
RECEIVER OF HIGH FREQUENCY ELECTRICAL SIGNALS
Original Filed May 29, 1923
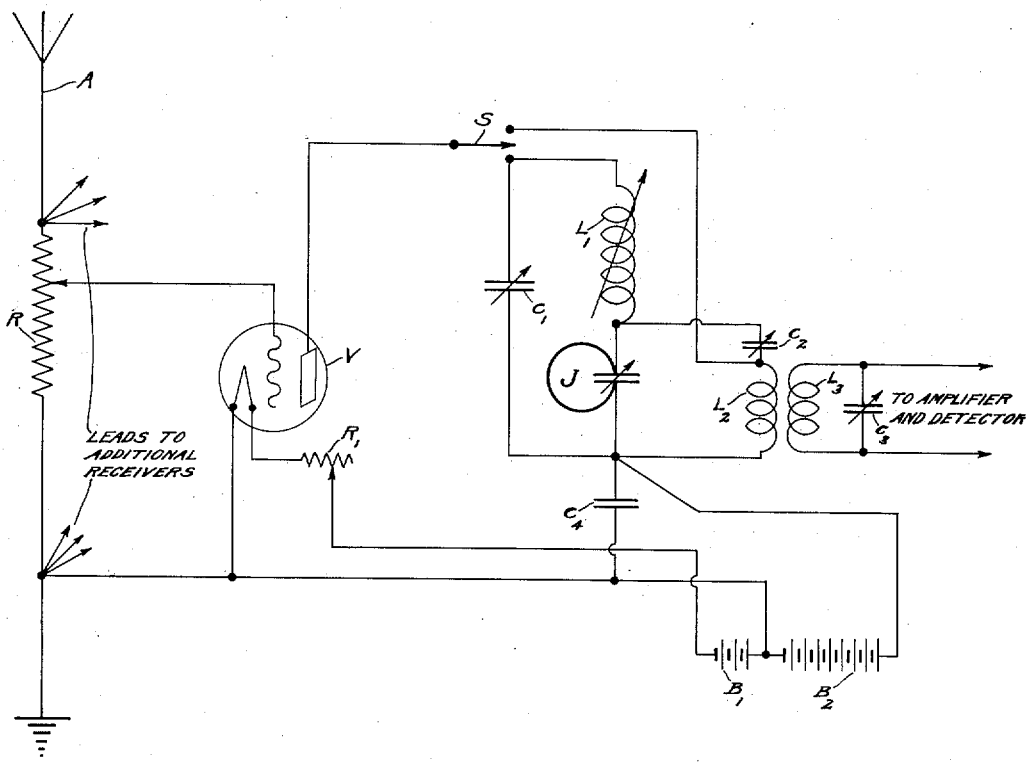
Inventor
Albert H. Taylor
By Robert A. Lavender
Attorney Reissued June 20, 1933 Re. 18,877

UNITED STATES PATENT OFFICE

ALBERT H. TAYLOR, OF WASHINGTON, DISTRICT OF COLUMBIA

RECEIVER OF HIGH FREQUENCY ELECTRICAL SIGNALS

Original No. 1,489,287, dated April 8, 1924, Serial No. 642,354, filed May 29, 1923. Application for reissue filed January 20, 1925. Serial No. 3,705.

My invention relates generally to the isolation of reactive effects occurring in one part of a signal receiving system from other parts of such a system.

One particular adaptation of my invention relates to the reception of a multiplicity of high frequency electrical signals employing the same collector or antenna in such manner that reactive effects in the collector are effectively isolated from the tunable circuits of an associated receiver and vacuum tube circuits.

In this particular adaptation of my invention one object is the multiple reception of such signals without disturbing reactions between the several tunable receivers connected to the one collector or between any of the parts of any one receiver and the antenna.

I utilize my invention by adapting well known forms of radio receiving systems including tuned vacuum tube amplifier and detector circuits to a special mode of association with an antenna system.

An effective amplifier and detector combination in a high frequency signal receiving system comprising a high frequency amplifier in advance of a detecting element was first disclosed by Schloemilch and von Bronk in U. S. Patent 1,087,892 of February 17, 1914. Alexanderson in U. S. Patent 1,173,079 of February 22, 1916, and Bucher in "Practical Wireless Telegraphy", 1917 edition, page 284, disclosed a like system having a cascade series of similar resonant circuits with interposed three-electrode vacuum tubes; while pages 54 to 59, "Wireless Age" for April 1923, and pages 67 to 71 of "The Wireless World and Radio Review" of April 21, 1923, cover in detail a number of features of such systems including the usual practice of using like fixed coils and rotary tuning condensers in each of the several tuning circuits whereby like movements of the condenser rotary elements produce like capacity or tuning change in the several circuits. These systems employ a high order of precision in the matter of selectivity, and therefore function to better advantage in the maintenance of the intended precise tuning when employed with my arrangement whereby any variations of reactance in the antenna are not disturbingly reflected into the tuning system.

My improvement is of particular value on shipboard where it may be desirable to receive a large number of signals simultaneously, and the facilities for rigging a number of antennæ are limited, and in like adaptations where the reaction isolating features offer advantageous immunity from reactance variations.

My invention will be best understood by reference to the accompanying drawing, the figure illustrating its use for the reception of radio signals. The figure is a schematic illustration of an arrangement permitting the connection of a plurality of selective receivers to an isolated antenna.

In the figure A is an antenna having high resistance in series therewith. The thermionic vacuum tube V has its grid circuit connected between two points in this resistance. The plate circuit of this vacuum tube contains a switch S which, in its lower position, connects to the tunable high frequency circuit having inductance $L_1$ and variable capacity $C_1$ in parallel relation. I find it preferable to make the ratio of inductance to capacity in this circuit large. There is also included in this circuit a device J which I term a rejector. It comprises a very low inductance element having very low resistance, usually being one or more turns of very heavy copper strip or wire and a large capacity condenser constructed to have small resistance, the condenser being made variable in order to permit of tuning the rejector element to the desired wave length. Shunted around the rejector is a tunable circuit containing inductance $L_2$ and variable capacity $C_2$ in series.

A receiver of the character hereinbefore referred to is associated with this last named circuit usually through a tunable circuit, usually constituting the first tuned radio frequency stage of the radio frequency amplifier of the receiver, and containing inductance $L_3$ and variable condenser $C_3$. $B_1$ is a source of current for heating the filament of the vacuum tube V and $B_2$ is a source of current for the plate circuit of this vacuum tube. These same sources may be used in connection with the amplifier and detector if vacuum tubes are used in connection therewith. The capacity $C_4$ is preferably large and is introduced mainly for the purpose of preventing a short circuit of battery $B_2$. The antenna may be tuned but this is not essential as the high resistance R in series therewith renders it aperiodic.

Any number of receivers may be connected with the antenna through similar vacuum tubes and circuits as described above through additional leads connected between points in the resistance R as illustrated and that such connections can be made without derogatory influences on the tuning system of the receiver is certain from analyzing the inherent actions and reactions of a system connected in accordance with my invention as follows:

The grid-to-plate capacity of the tube V is the only reactive coupling element between the antenna system on the one side of the tube and the elements of the tuning system on the other side of the tube. Since the grid-to-plate capacity of such tubes is exceedingly small, 6 to 8 micro-micro-farads being usual, the effective reactive coupling between the two parts of the system is accordingly practically negligible in proportion to the reactive effects and variations of them in the tuning elements going to make up the tuning system and in the physical elements going to make up the antenna system.

For example, alterations may be made in the antenna system, or in the connections thereto, which change the effective capacity of the antenna system many micro-micro-farads without this change in capacity reaction being reflected into the tuning circuits in the output system of the tube V, or in the input system of the radio frequency amplifier connected to this output circuit.

In other words, the mutual reaction by way of the grid-to-plate capacity of the tube in its coupling effect between the antenna system on the one side of the tube and the tuning system on the other side of the tube is such that it qualifies under the term of very loose coupling.

As a result of this loose coupling the tuning condensers $C_2$, $C_3$, etc. in the circuits of the vacuum tube amplifier system tune to definite dial indications from one wave length to another under all conditions of the antenna system, and no change in the reactive conditions of the antenna will alter the dial readings of the condensers or tuning devices that may be employed succeeding tube V or in succeeding stages of a multi-stage radio frequency amplifier. Where the tuning circuits are alike, as in some of the examples of the prior art, the dial settings will be alike in tuning from one wave length to another.

I term the vacuum tube V a coupling tube because it couples the collector to the selective circuits and receiver as illustrated and at the same time prevents reactive interaction between them or between selective circuits of different receiving systems connected to the antenna.

The operation of the system is as follows:

Assuming that a number of signals of different frequencies are being collected on the antenna A, the desired signal is selected out by tuning the inductance $L_1$ or condenser $C_1$ which admits this particular signal to the circuit containing these elements. However, as other signals cannot be entirely excluded from this circuit, the tuning of the rejector J to the frequency of the desired signal permits further selectivity, the desired signal being accepted by the rejector and all other signals being rejected or by-passed by the low inductance element of this device. The desired signal is then passed on to the receiver through the tuned circuit containing inductance $L_2$ and capacity $C_2$, any residual undesired signal being excluded from this circuit through being out of tune with it.

To aid in picking up signals the switch S is thrown into the up position, in which it eliminates the intermediate selective circuits, connecting the coupling tube directly to the circuit containing inductance $L_2$ and capacity $C_2$. This arrangement not being so selective as the rejector circuit permits of the signal being picked up promptly and adjusting the receiver containing inductance $L_3$ and capacity $C_3$ to the desired frequency. Having found the desired signal and adjusted the receiving circuits, the switch S may be thrown to the down position connecting in the intermediate selective circuits and these are then tuned until the desired signal is brought in and the undesired signals excluded.

The amplifier and detector indicated in the figure may include a three electrode vacuum tube amplifier and contact detector which may be substituted by a vacuum tube or other suitable detector. The receiver may be of the tuned radio frequency form, an example of which is illustrated at page 284 of Practical Wireless Telegraphy, 1917 edition, by Bucher, and has a tunable input circuit comprising tuning condenser $C_3$ and coil $L_3$ coupled to the coil $L_2$ in the output circuit of coupling tube V connected to the antenna A, which antenna is a circuit that is aperiodic or untuned by reason of the coupling resistance R.

Inherently all of the tuning system following the coupling tube V and untuned antenna is well isolated electrically from effects originating on the opposite side of the coupling tube that would interfere without such isolation with the self included tuning characteristics of this tunable part of the system, thereby insuring that the tuning devices associated with the output of and succeeding the coupling tube shall be independent in their tuning functions of the electrical constants of the untuned antenna or absorption structure.

While I have described my invention in connection with particular practical embodiments thereof, no limitations are intended by reason of the selection of the particular embodiments for explanatory purposes, the invention being one of general and broad application.

Having described my invention I claim:

1. In a system for the reception of high frequency electrical signals the combination of a collector circuit having a high resistance in series therewith, a coupling thermionic vacuum tube having its input circuit connected between two points in said resistance and an output circuit having in series therewith a tunable circuit containing variable constants in parallel relation, a tunable rejector circuit in series relation within said tunable circuit, a tunable circuit in parallel relation to said rejector, and a receiver associated with said last tunable circuit.

2. In a system for the reception of high frequency electrical signals the combination of a collector circuit having a high resistance in series therewith, and a plurality of receivers connected thereto each through the following elements: a coupling thermionic vacuum tube having its input circuit connected between two points in said resistance and an output circuit having in series therewith a tunable circuit containing variable constants in parallel relation, a tunable rejector circuit in series relation within said tunable circuit, and a tunable circuit in parallel relation to said rejector.

3. In a system for the reception of high frequency electrical signals, the combination of a collector circuit, a thermionic vacuum tube having its input circuit associated with said collector circuit to derive signal energy therefrom, and an output circuit for said tube having in series therewith a tunable circuit containing variable constants in parallel relation, a tunable rejector circuit in series relation within said tunable circuit, a tunable crcuit in parallel relation to said rejector, and a receiver associated with said last tunable circuit.

4. A radio receiving system comprising the combination with an absorption structure, of a plurality of circuits in cascade, means for tuning each of said circuits, and a three-electrode vacuum tube interposed between the first of said tuned circuits and said absorption structure, the input of said tube and said absorption structure constituting an input system the magnitudes of whose inductance and capacity are substantially constant and so related to said tunable circuits as to permit equal movements of their tuning devices in adjusting from resonance for one wave length to resonance for another wave length, characterized by the fact that the output circuit of the three-electrode vacuum tube interposed between the first of said tuned circuits and said absorption structure is substantially devoid of fluctuating or alternating current except current of radio frequency.

5. A radio receiving system comprising the combination with an absorption structure, of a plurality of circuits in cascade, means for tuning each of said circuits, and a three-electrode vacuum tube having its output operatively related to the first of said tuned circuits and having its input electrodes non-reactively conductively connected with said absorption structure, said absorption structure and the input of said tube constituting an input system the magnitudes of whose inductance and capacity are substantially constant and so related to said tunable circuits as to permit equal movements of their tuning devices in adjusting from resonance for one wave length to resonance for another wave length, characterized by the fact that the output circuit of said three-electrode vacuum tube is substantially devoid of fluctuating or alternating current except current of radio frequency.

6. In a signal receiving system comprising an absorption structure and a receiver including a plurality of adjustable circuits for selective tuning, the method of rendering tuning variations of the electrical constants of said adjustable circuits independent of the electrical characteristics of said absorption structure which consists of aperiodically transferring and thermionically relaying the energy from said absorption structure to said adjustable circuits.

ALBERT H. TAYLOR.